United States Patent [19]

Nilsson

[11] Patent Number: 5,340,526
[45] Date of Patent: * Aug. 23, 1994

[54] TEMPERATURE CONDITIONING

[75] Inventor: Torsten Nilsson, Löddeköpinge, Sweden

[73] Assignee: PLM AB, Malmo, Sweden

[*] Notice: The portion of the term of this patent subsequent to Sep. 8, 2002 has been disclaimed.

[21] Appl. No.: 899,438

[22] Filed: Jun. 16, 1992

Related U.S. Application Data

[63] Continuation of Ser. No. 536,585, Jul. 3, 1990, Pat. No. 5,145,629.

[30] Foreign Application Priority Data

Nov. 14, 1988 [SE] Sweden .................. 8804102-5

[51] Int. Cl.⁵ .............. B29C 35/02; B29C 55/22; B29C 49/64
[52] U.S. Cl. ................ 264/292; 264/521; 264/532; 264/535; 264/DIG. 65; 264/DIG. 73; 425/384; 425/393; 425/394; 425/417; 425/526; 425/529; 425/534; 425/DIG. 39; 432/224; 432/225
[58] Field of Search .......... 264/292, 322, 323, 327, 264/520, 521, 519, 532, 535, 538, DIG. 65, DIG. 73; 425/384, 393, 417, 526, 529, 534, 540, DIG. 10, DIG. 14, DIG. 39, 394; 432/224, 225

[56] References Cited

U.S. PATENT DOCUMENTS

| | | | |
|---|---|---|---|
| 3,425,093 | 2/1969 | Ansette | 264/322 |
| 4,097,570 | 6/1978 | Dickson et al. | 264/521 |
| 4,115,494 | 9/1978 | Valyi | 264/538 |
| 4,116,606 | 9/1978 | Valyi | 425/526 |
| 4,397,629 | 8/1983 | Akutsu et al. | 425/393 |
| 4,422,843 | 12/1983 | Aoki | 425/526 |
| 4,499,044 | 2/1985 | Höne et al. | 264/521 |
| 4,571,173 | 2/1986 | Chang et al. | 264/521 |
| 4,595,550 | 6/1986 | Jakobson et al. | 425/529 |
| 4,701,121 | 10/1987 | Jakobsen et al. | 425/526 |
| 4,803,024 | 2/1989 | Nilsson | 264/521 |
| 4,828,783 | 5/1989 | Albrecht et al. | 264/323 |
| 4,847,032 | 7/1989 | Albrecht et al. | 264/521 |
| 4,894,198 | 1/1990 | Albrecht et al. | 264/521 |
| 4,927,591 | 5/1990 | Nilsson | 264/521 |

FOREIGN PATENT DOCUMENTS

| | | | |
|---|---|---|---|
| 280203 | 8/1988 | European Pat. Off. | |
| 8406373H | 7/1987 | Sweden | |
| 2112697 | 7/1983 | United Kingdom | 264/521 |
| 8600565 | 1/1986 | World Int. Prop. O. | |

*Primary Examiner*—Jan H. Silbaugh
*Assistant Examiner*—Catherine Timm
*Attorney, Agent, or Firm*—Ladas & Parry

[57] ABSTRACT

A method for temperature conditioning a blank of plastic material in which a conditioning mandrel is placed within the blank and thereafter expanded into reliable abutment against the inner surface of the blank. The mandrel is thereafter returned to its initial position. The outer surface of the mandrel is adjusted to and maintained at a certain temperature, whereby, during the abutment, an energy exchange takes place between the blank and the mandrel for adjusting the temperature of the blank. At high temperatures of the mandrel, the mandrel is displaced out of the blank after such short time that the plastic material in the region of the abutment surface never passes the critical temperature of tackiness of the plastic material and/or thermal crystallization of the plastic material. As a rule, the expansion and contraction of the mandrel is repeated one or more times.

16 Claims, 6 Drawing Sheets

TEMPERATURE CONDITIONING

This is a continuation of copending application Ser. No. 07/536,585 filed on Jul. 3, 1990, now U.S. Pat. No. 5,145,629 and International Application PCT/SE89/00654 filed on Nov. 14, 1989 and which designated the U.S.

FIELD OF THE INVENTION

The present invention relates to a method and an apparatus for controlling heat treatment of a tubular plastic article by a mandrel inserted into the article.

BACKGROUND AND PRIOR ART

It is previously known to reform, using a mechanical tool, a blank of plastic material into an intermediate preform or into a container.

Thus, it is known to reform a tubular blank into an intermediate preform by extending the blank in its axial direction with simultaneous orientation of its material. This takes place once the material in the blank has been set at an elevated temperature, whereafter, for example, a rod displaces the bottom of the blank relative to the mouth portion of the blank.

U.S. Pat. No. 4,580,968 describes an alternative technique in which a tubular blank is reformed into an intermediate preform in which the material of the blank passes through a gap in a mechanical forming tool, the gap width being less than the material thickness of the blank. In such instance, a transition zone is moved in the axial direction of the blank between substantially amorphous plastic material (thick material) and oriented material (thin material) under the reduction of the amount of amorphous (thick) material and increase of the amount of oriented (thin) material.

On displacement of the transition zone, the plastic material is oriented. This patent describes an embodiment in which the gap is formed between a draw ring and a mandrel located within the blank. Displacement of the transition zone is realized in that the mandrel displaces a blank placed on the mandrel in relation to the draw ring, amorphous material in the blank passing through the gap and being oriented in the direction of displacement of the transition zone.

The above-described orientation of the plastic material in a blank by means of a mandrel and a draw ring is generally preceded by a setting of the temperature of the material at an elevated level. For, example, polyethylene terephthalate, hereinafter generally abbreviated to PET, a temperature is normally selected which slightly exceeds the glass transition temperature of the material, however, the temperature may also be in the region of or slightly less than the glass transition temperature of the material. Hereinafter, the designation TG will generally be employed to indicate the glass transition temperature of the plastic material. On entry into the above-mentioned gap, the material is generally at the elevated temperature.

The material then passes through the gap, it being required that the contact surface of the material against the draw ring is at a temperature less than a certain maximum temperature. This permitted maximum temperature is determined by the material in the draw ring which forms an abutment surface against the plastic material in its transition zone and by the relevant plastic material. The above condition regarding maximum temperature of the plastic material also applies to the contact region between the plastic material and the mandrel disposed within the blank. A further requirement related to adjustment of the temperature of the plastic material is that such temperature adjustment must, for reasons of process engineering and also for reasons of production capacity, if possible be effected with as a slight an influence as possible on the cycle time of the equipment and preferably without affecting this cycle time whatsoever. Naturally, this requirement is conditioned by the desire of maintaining the capital cost per produced unit as low as possible. Moreover, in certain physical applications there are requirements that the temperature of the plastic material display minimal variation from one blank to another. In the above-described orientation of plastic material by means of a gap, it is desirable for certain plastic materials that the material temperature vary by at most approx. 2° C.

EP 204 810 describes a technique in which a hot mandrel is inserted in a preform of thin plastic material and progressively heats the material during simultaneous expansion of the preform as the material of the preform is brought into abutment against and displaced over the outer defining surface of the mandrel. A drawback inherent in this technique is that the temperature of the mandrel must be kept relatively high, which, for certain plastic materials such as PET, leads to undesirably high friction.

In all of the above-described physical applications, the plastic material is, as a rule, given an elevated temperature before the reforming operation, since the elevated temperature is normally a prerequisite to enable application of the technique involved and in order that the product obtain the contemplated properties. The heating is effected in accordance with prior art using radiation energy. Because of the characteristics of the plastic material, such heating has a low level of efficiency. In order to reduce the heating time, use is made, therefore, of high temperatures at the radiation source, which, however, leads to problems if the blank remains in the heating position for too long. Such unintentional extended heating time often occurs in disruptions in the production process, for example an interruption in any of the processing stages which follow after heating of the blank. Such undesirable extension of the heating time in operational disruption will often result in sticking of the blank in the heating position or, at worst, in the blank catching fire unless special measures are implemented to screen off or remove the blank from the radiation source when the unintentional disruption occurs. It is obvious that if a blank sticks in the equipment, a relatively lengthy disruption in production will occur, in particular if the heating devices must be cooled in order to enable removal of the stuck blank. Both such disruptions and extra arrangements included in the equipment to screen off the blank from the radiation source in connection with production disruptions entail extra costs which render production and, thereby, the product itself more expensive.

It will be obvious to one skilled in the art that there are, in many technical contexts, needs for a rapid temperature conditioning of plastic material, often in combination with desires for slight deviation in the temperature of the material for which the temperature conditioning has been carried out. In addition, there are often requirements that the temperature of the material in all parts of the blank be at the predetermined temperature. The term "temperature conditioning" is also here taken to mean cooling of the plastic material.

SUMMARY OF THE INVENTION

The present invention seeks to a method and an apparatus in which the above drawback are obviated and in which the above requirements have been satisfied. This is attained by a method and an apparatus in which the mandrel is expanded within the plastic blank to abut against the inner surface of the blank and after a determined abutment period, the mandrel is contracted.

At excessively high temperatures of plastic material, a considerable increase in friction will generally occur on contact with metal, and often also a tendency to tackiness between the plastic material and the metal. In the case of PET for example, an increase by a factor of 10 of the friction will occur if the material temperature in the region of TG increases by approx. 10° C. This is one of the reasons why prior art technology generally avoids, on heating of the plastic material in a blank, direct contact between the plastic material and mechanical heating tools and instead calls for the employment of radiation energy for the heating operation. A temperature conditioning of the material in the blank takes place according to the present invention by means of a mechanical tool which is displaced to a position within the blank. The mechanical tool is hereinafter also referred to as temperature conditioning device or first mechanical device. The device consists, in the region where it abuts against the blank, of a material of superior thermal conductive capacity, normally of metal. Since the temperature conditioning device abuts against the plastic material of the blank for but a short time, the above-mentioned tendency to tackiness will be avoided even though the device, in certain embodiments, is at a relatively high temperature. The direction of displacement of the device in relation to the plastic material is selected such that friction problems are avoided. The selected direction of displacement also entails the advantage that, for all of the material portions which are temperature conditioned, temperature adjustment takes place during a substantially equal length of time. When the possibility of employing a large temperature difference between the temperature conditioning device (the temperature conditioning mandrel) and the plastic material is employed, an extremely rapid transfer of energy will be achieved between the conditioning device and the plastic material.

At high temperatures of the conditioning device, the abutment is limited to such a short time that the plastic material in the region of the abutment surface never passes the critical temperature at which adherence takes place between the plastic material and the material of the heating mandrel and/or thermal crystallization of the plastic material begins to occur. The supply of energy during the brief contact between the heating device and the plastic material continues once contact has ceased, at the same time as the temperature of the plastic material in the region most proximal the abutment surface of the blank begins to fall. Under continued displacement of the thermal energy towards the opposing side of the blank, a reduction of the temperature of the plastic material continues adjacent to that surface with which the blank abutted against the heating device.

When the temperature reduction has continued so far that the risk of tackiness and/or thermal crystallization is eliminated, the same conditioning device or another conditioning device is once again lo displaced into the blank, being moved into abutment against the inner surface of the blank. A thermal transfer during a limited period of time once again takes place to the plastic material, whereby a further thermal wave commences its displacement towards the opposing side of the blank. In one preferred embodiment, energy supply to the material of the blank takes place on at least two mutually subsequent occasions. Each time and after the first occasion when energy is supplied to the material of the blank, the thermal energy from the immediately preceding occasion has reached material in the blank located a distance from the abutment surface of the blank corresponding to at least approx. 1/6, as a rule at least approx. 1/5 and preferably at least approx. ¼ of the wall thickness of the blank. However, it has surprisingly established that, in certain physical applications, only one heating period is required, in particular when the material is thin and is heated to relatively low temperatures.

As a rule, an individual blank abuts only once against each conditioning device. However, the inventive concept as herein disclosed also encompasses embodiments in which one and the same conditioning device abuts against the individual blank more than once, and in certain applications on all occasions.

In one preferred embodiment of the present invention, the blank is placed, prior to the displacement in relation to the conditioning mandrel, in a holder which is also at an elevated temperature. The holder is disposed to be rotated about a center axis is located outside the holder and, thereat, to be displaced to mutually subsequently located positions. In at least one of these positions—as a rule the second—a displacement of a conditioning mandrel takes place to a position within the blank. After the predetermined abutment time against the inner surface of the blank, the conditioning mandrel is withdrawn from the blank, whereafter the holder is rotated about its center axis to its next position. During this displacement, the migration of the energy wave commences towards the outer surface of the blank. After a predetermined time, a conditioning mandrel is once again displaced into the blank, energy being once again supplied to the plastic material of the blank. The mandrel is thereafter moved from the position within the blank, whereby the blank is given the possibility of being moved to the next position by means of the holder. The number of positions, abutment times and/or displacement speeds of the container are determined int. al. by the thickness of the plastic material in the blank, by the thermal conductivity of the plastic material, by the temperatures of the abutment surfaces of the conditioning mandrels, and by the temperature to which the plastic material is to be heated.

It should be observed that the described embodiment with the blank placed in a holder which is rotated about a center axis located outside the holder gives the possibility of providing, in each position, one conditioning mandrel specific to that position, the mandrel being, for instance, set at a predetermined and specific temperature for the position, having a design specific to the position, having a pattern of movement specific to that position, etc. Hence, in certain embodiments temperature and/or material in the abutment surface of the mandrel vary from position to position. Hereby, the possibility is created of controlling both the abutment time of the plastic material in each separate position and of minimizing the risk of undesirable friction and/or tackiness tendencies in each respective position.

In physical applications of the present invention in which the plastic material of the blank is temperature conditioned in order that the material be of a suitable temperature for attenuation, for example be oriented in that it passes through a gap (for instance employing a technique corresponding to that described by way of introduction), one preferred embodiment of the present invention calls for the selection of the speed of the draw ring in relation to the plastic material of the blank to be lower in the initial stage of the displacement of the draw ring than during the remainder of the forming process. Hereby, an energy wave will be established in the transition region between thick material and attenuated material occasioned by the thermal energy which is released in connection with the reduction of the material thickness. As a result of the selected low speed of displacement of the draw ring, this energy wave will have time to move in the plastic material such that this attains a temperature suited for the subsequent processing (the attenuation). When this has taken place, it has surprisingly proved possible to achieve a drastic increase of the speed of displacement of the draw ring. Thus, an increase by a factor of up to approx. 5 will be tolerated by the material without any injurious effect on the quality of the attenuated material. If, conversely, the initial drawing speed is too high, the energy wave will not have sufficient time to exercise its full effect. (This is probably because the speed of displacement of the draw ring exceeds the speed of propagation of the energy in the plastic material).

DETAILED DESCRIPTION OF PREFERRED EMBODIMENTS

Figure 5A:
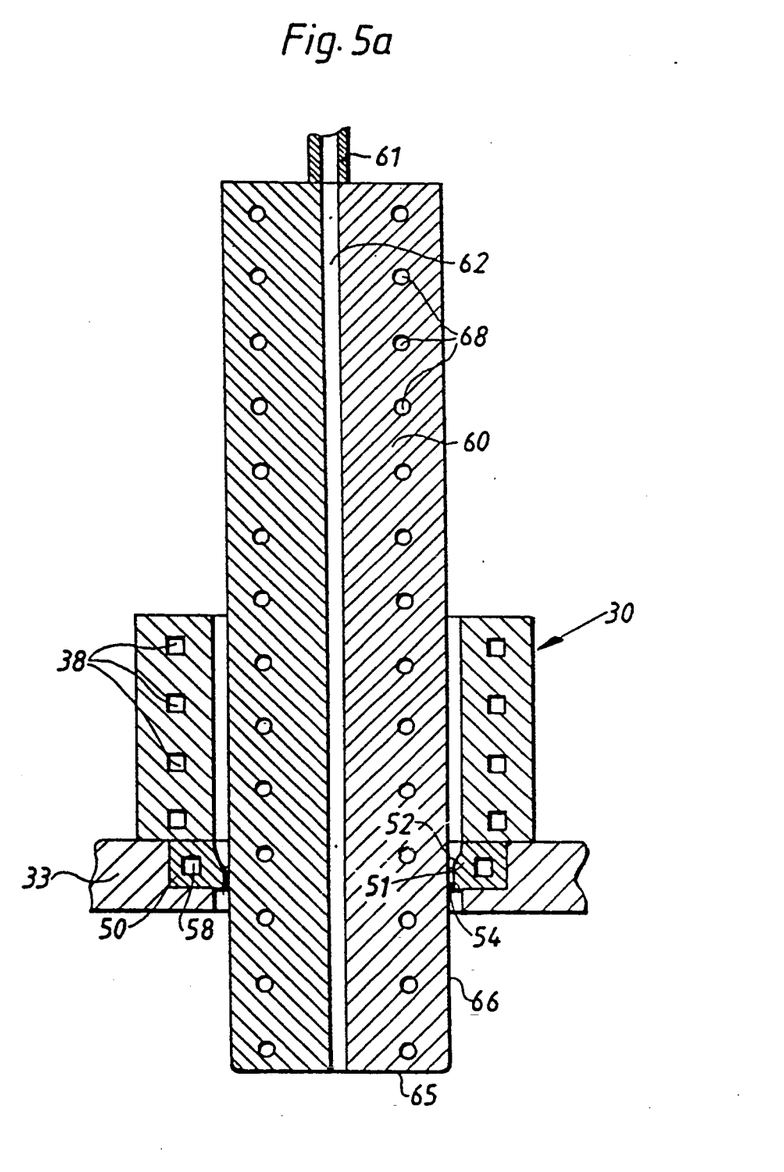
FIG. 5a is a cross section corresponding to the section in FIG. 4 without a blank in the holder and receptacle device, in which the orientation mandrel has been displaced downwardly in the Figure.
Figure 5B:
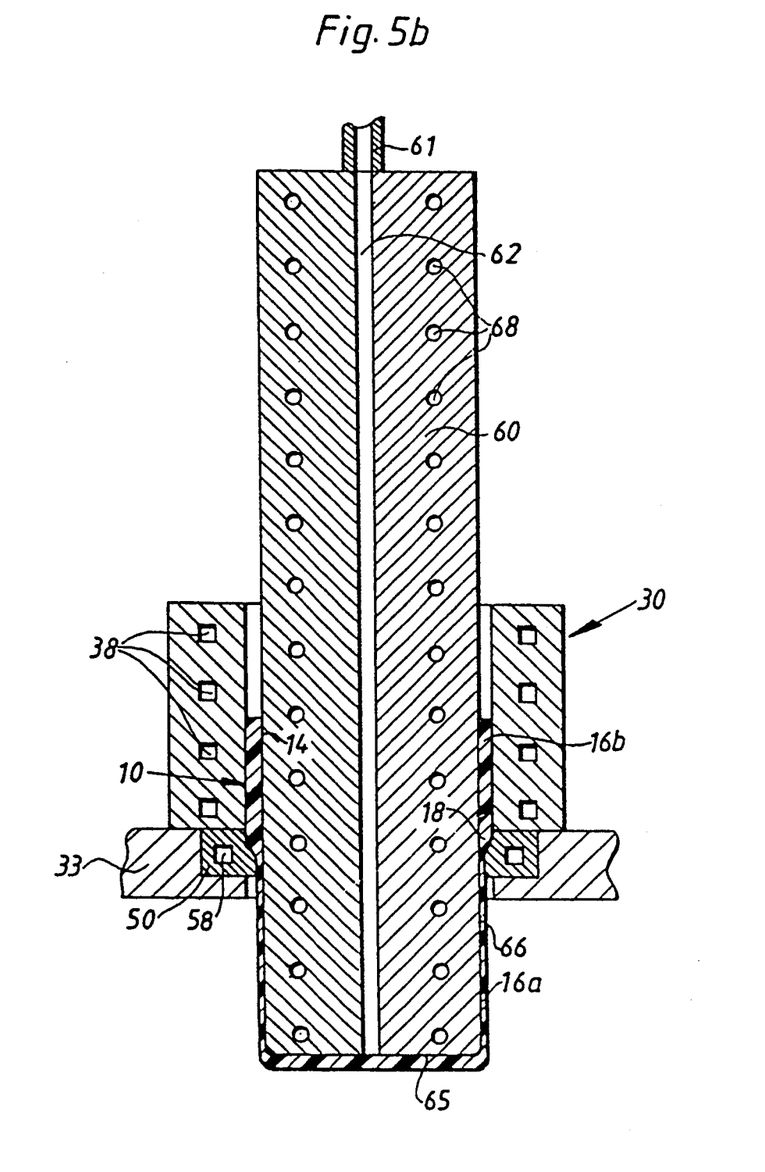
FIG. 5b is a cross section corresponding to the section of FIG. 5a with the blank in the holder and receptacle device.

Referring to the Drawings, there is seen one embodiment of the present invention, adapted to act on a blank 10 having a sealed bottom portion 11 and a mouth portion 12. The blank has an inwardly facing bottom surface 13 and an inwardly facing, generally substantially cylindrical or slightly conical surface 14 which defines the wall 15 of the blank. If surface 14 is conical, its largest circumference is in the mouth portion 12. The outer surface of the wall is designated by reference numeral 17. FIG. 5b shows how the blank has been partially subjected to a reforming operation, whereby there is formed a thinner wall portion 16a in the lower region of the blank, while the remaining wall portion 16b still retains its original form. A transition region 18 is to be found between the wall portion of original thickness and the wall portion of reduced thickness.

A receiving device 30 (cf. FIGS. 1a and 1b), which also constitutes a holder for the blank, has a side wall 31 whose inner defining surface 32 is of a size and configuration which substantially correspond to the outer configuration of the wall 15 of the blank. Channels 38 for a thermal medium (heat carrying medium) are disposed in the side wall. A substrate, for example a plate 33, is located beneath the side wall 31 of the holder for supporting the blank.

A mechanical device which, in the Figures, is shown as a mandrel 20 (cf. FIG. 1b), hereinafter non-restrictively designated as a conditioning mandrel 11 is connected through the intermediary of a drive shaft 21 to drive means (not shown). The drive means are disposed to displace the mandrel from the position illustrated in FIG. 1b, in which the mandrel is located above the blank, to the position illustrated in FIG. 2, in which the mandrel is inserted in the blank. The conditioning mandrel is disposed to be adjusted to a certain temperature which is adapted to that temperature at which the material of the blank is to be set. To this end, the conditioning mandrel is provided with ducts 28 for a heat carrying medium. In certain physical applications, the mandrel placed within the blank emits energy to the blank, while in other physical applications, the mandrel removes energy from the blank. The outer defining surface (side surface) 26 of the conditioning mandrel is dimensioned so as to have a configuration substantially corresponding to the configuration of the inwardly facing defining surface 14 of the blank. However, as a rule the dimensions of the blank vary from one blank to another, for which reason the conditioning mandrel is, in one preferred embodiment, provided with a first mandrel portion 22 and a second mandrel portion 23 which, by drive means (not shown), are displaceable from one another for increasing the circumference of the conditioning. The mandrel portions are, in this instance, separated from one another at the longitudinal section 24. It will be obvious to one skilled in the art that, in certain embodiments, use is made of more than two mandrel portions, particularly in physical applications in which the variation of the circumference of the conditioning mandrel is great. The mandrel is defined by a bottom surface 25. As is apparent from FIG. 3, at least one gap 27 formed between the mandrel portions upon their displacement from one another.

FIGS. 4, 4a, 5a and 5b show the receiving device, the holder 30, in cooperation with an orientation mandrel 60 which, via a drive shaft 61, is connected to drive means (not shown). The mandrel has outer dimensions corresponding to the inner dimensions of the blank 10, which entails that, with the mandrel placed in the position illustrated in FIG. 4, the side surface 66 of the mandrel abuts, at least with its lower portion, against the inner surface 14 of the blank. Channels 68 are provided in the orientation mandrel for adjusting the temperature of the side surface 66 of the orientation mandrel. The bottom surface 65 of the mandrel is disposed to abut against the inwardly facing bottom surface 13 of the blank.

FIGS. 4, 4a, 5a and 5b show how the substrate 33 is provided with an aperture 35 of a size allowing the blank to pass through the aperture. In association with the aperture, there is provided a draw ring 50 with a circumferential region 51 in which the inner circumference of the draw ring is reduced from a larger size most proximal the blank to a smaller size more distal from the blank (cf. FIG. 4a). This circumferential region is defined towards the center of the aperture by a working surface 52. Just as the side wall 31 of the holder is provided with one or more channels 38 for heat carrying medium, the draw ring 50 is provided with one or more channels 58 for adjusting the temperature of the working surface 52 of the draw ring. With the draw ring inserted in the aperture (cf. FIG. 5a) a gap 54, hereinafter referred to as a draw ring gap, is formed between the draw ring and the orientation mandrel, the gap having a width which is less than the material thickness of the blank 10.

Figure 6:
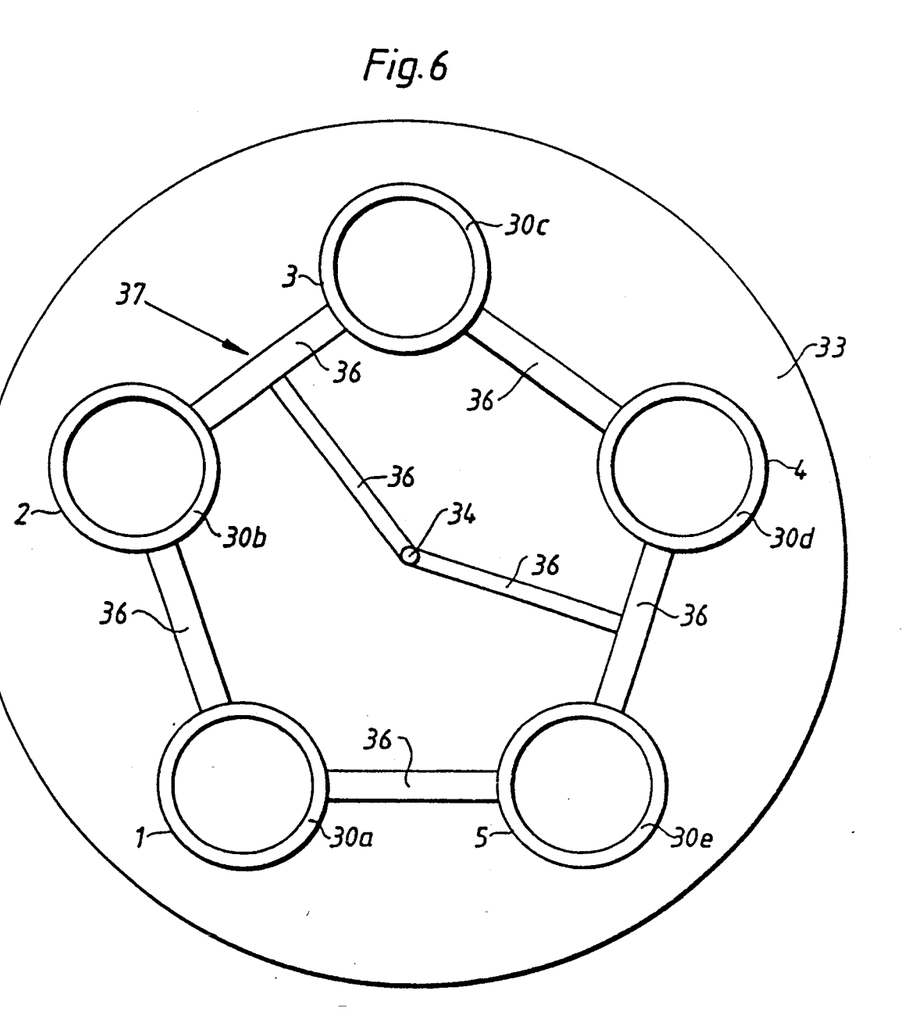
FIG. 6 is a top plan view of an apparatus for receiving, temperature conditioning and reforming of the blank.

FIG. 6 shows one preferred embodiment of the present invention in which the substrate plate 33 is disposed under a composite unit 37 formed by a number of reception cups (holders) 30a–30e, which are secured to one another connection devices 36. In such instance, the holders are generally designed as substantially cylindrical tubes 30a–30e open at both ends. The composite unit is connected via the connection devices, to a center shaft 34 about which drive means (not shown) rotate the unit to predetermined positions in which the combinations of devices described with reference FIGS. 1–5 are formed. In certain physical applications, the center shaft is fixedly connected to the composite unit so as to rotate it. The movement of rotation about the center of the composite unit is, in this instance, indexed such that the holders are located, with preadjustable intervals, in one of the positions indicated by reference numerals 1–5. The displacement of the holders to positions 1–5 takes place by relative movement in relation to the substrate 33 which, as a rule, is in a fixed position.

Figure 1A:
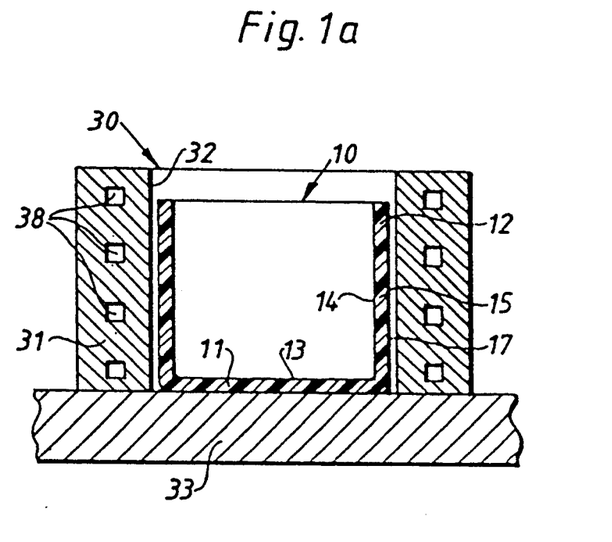
FIG. 1a is a cross section through a combined holder and receptacle device for a blank.
Figure 1B:
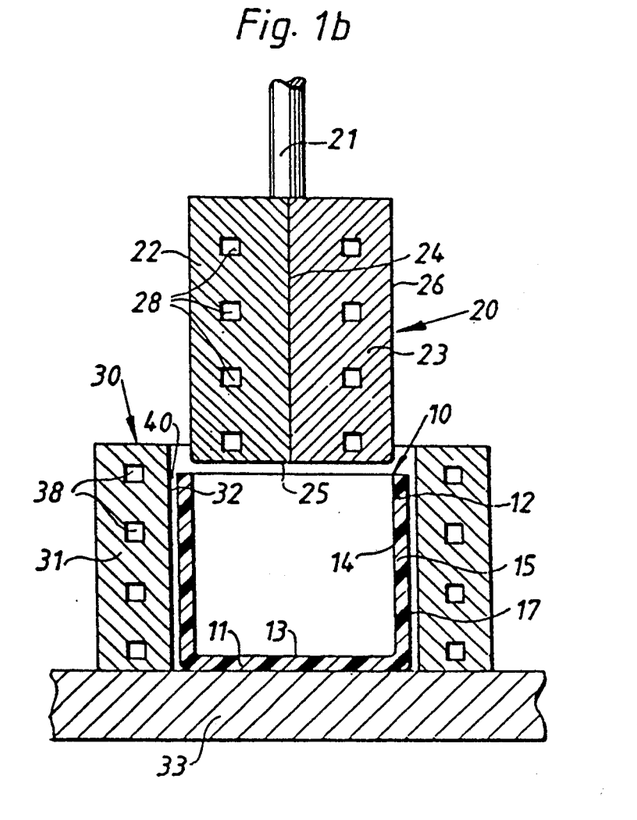
FIG. 1b is a cross section corresponding to the cross section of FIG. 1a, with a conditioning mandrel located above the holder.
Figure 2:
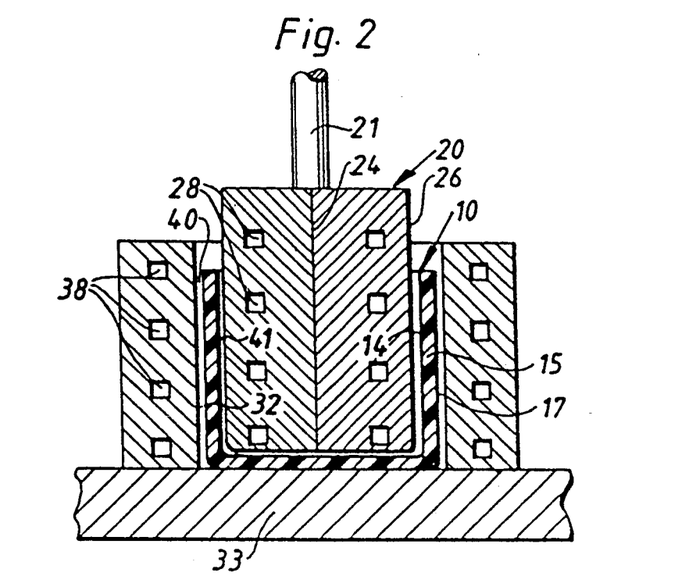
FIG. 2 is a cross section corresponding to the section of FIG. 1 in which the conditioning mandrel is inserted in the blank.
Figure 3:
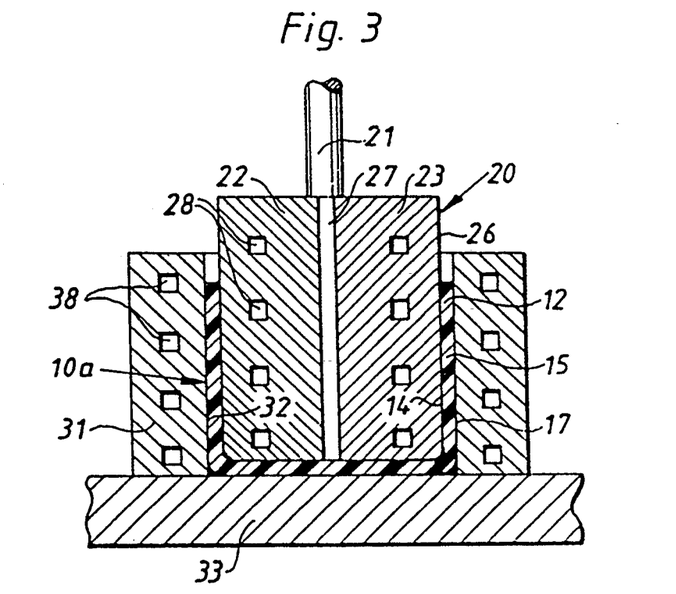
FIG. 3 is a cross section corresponding to the section of FIG. 2, in which the conditioning mandrel has been expanded.
Figure 4:
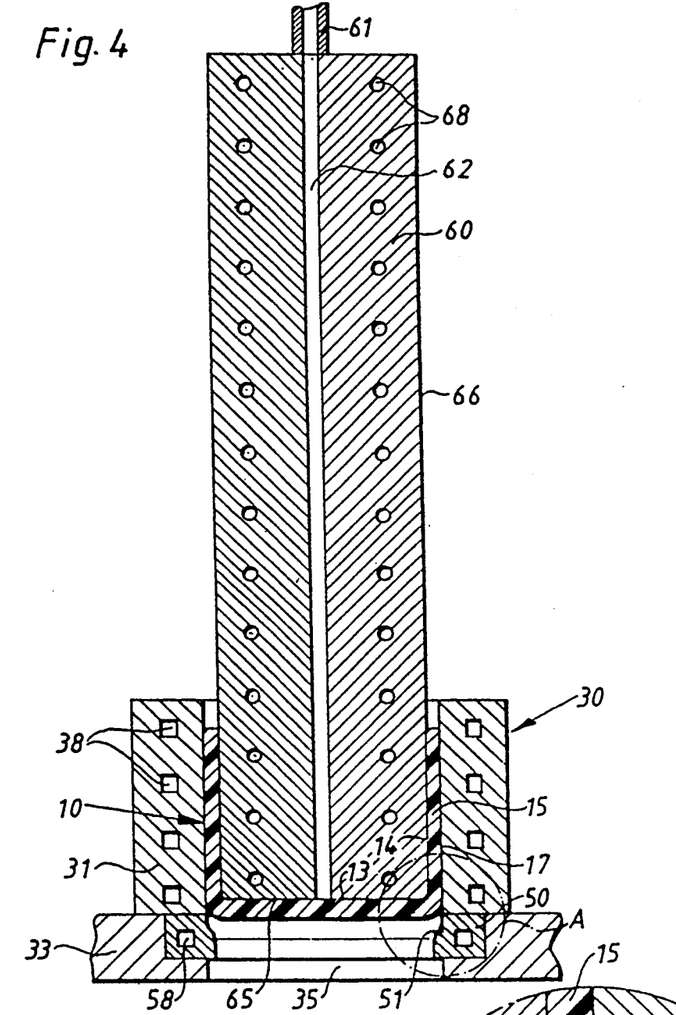
FIG. 4 is a cross section corresponding to the previous cross sections, in which an orientation mandrel is inserted in the blank.
Figure 4A:
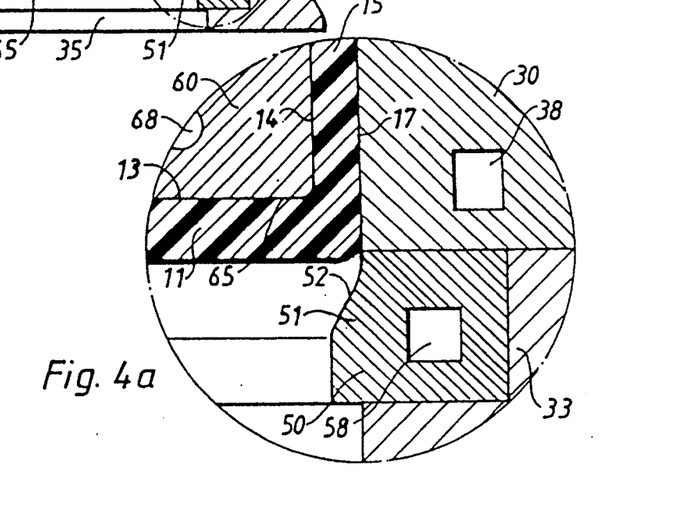
FIG. 4a shows the region marked A in FIG. 4 on a larger scale.

In position 1, which has its counterpart in FIG. 1a, the blank 10 is received by the receiving device (the holder) 30a which, in FIG. 6, is located in position 1. Positions 2, 3 and 4 each correspond to those combinations of devices as are illustrated in FIGS. 1b, 2 and 3; and position 5 has its counterpart in the combination of devices shown in FIGS. 4, 5a and 5b. In the region corresponding to position 5 for the holder 30, the plate 33 is provided with the aperture 35 and the draw ring 50. In the illustrated embodiment, the apparatus allows for temperature conditioning of the blank at a maximum of 3 occasions as necessary.

The apparatus includes control and regulation means (not shown) for controlling and regulating the movements and expansion of the conditioning mandrel and, in this instance, also the time interval during which the abutment of the mandrel proceeds. The control and regulation means (not shown) are also disposed for adjustments of the temperature of the medium supplied to the conditioning mandrel 20, the holder 30 and, where applicable, the draw ring 50. When the present invention is reduced into practice, the blank 10 is displaced into the receiving device (the holder 30a) to the position illustrated in FIG. 1a. Thereafter, the composite unit 37 is rotated through one position, whereby the holder 30a is moved to position 2. During this displacement, the holder slides on the upper defining surface of the plate 33. In position 2, the conditioning mandrel 20 is displaced from an upper position (cf. FIG. 1b) to a lower position (cf. FIG. 2). In the upper position, the conditioning mandrel is located above and outside the blank, and in the lower position within the blank. In one preferred embodiment, the conditioning mandrel is dimensioned so as, with its outer defining surface 26, to form a gap 41 with the inner defining surface 14 of the blank. As a result, the inwardly facing surface 14 of the blank is prevented from coming into contact with the mandrel 20 during its movement into the blank and this, thereby, avoids the risk of, for instance, uncontrolled heating of the material of the blank and consequential risk of undesirable friction between the mandrel and the plastic material.

In view of the varying sizes of the blanks, the holder is, in one preferred embodiment, also dimensioned to form a gap 40 between itself and the outwardly facing defining surface 17 of the blank. The conditioning mandrel is thereafter expanded into abutment against the inner defining surface of the blank and, as a rule, thereafter an additional distance to displace material of the blank outwardly into reliable abutment against the inwardly, facing defining surface 32 of the holder. The expansion of the conditioning mandrel is controlled so as to continue until the blank abuts with its outer surface against the inner surface of the holder. By such means, there will be achieved reliable contact between the conditioning mandrel and the blank and between the holder and the blank, and efficient control of the energy transfer between the blank, the mandrel and the holder, respectively. In one preferred embodiment, use is made of a relatively slight degree of expansion, as a rule limited to at most approx. 20% and preferably to at most approx. 10%. In case of slight expansion, but a limited number of mandrel parts are required, while in case of a greater degree of expansion, the number of mandrel parts is increased so as to reduce the width of those gaps which are formed on expansion between the mandrel parts. As a result, there will be ensured a uniform heating of the plastic material. The temperature of the abutment surfaces of the mandrel against the blank are adjusted by means of heat carrying medium in the ducts 28 and channels 38 of the conditioning mandrel and holder, respectively.

The following example of employed temperatures and times may be given for temperature conditioning of PET. The temperature of the outer surface 26 of the conditioning mandrel 20 is, as a rule, in excess of the region of TG and in such instance, by at least 10° C., as a rule by at least 30° C. and preferably by at least 50° C. Control and regulation means are employed to adjust the time for the abutment of the conditioning mandrel against the inner surface of the blank, this being selected to be at most approx. 5 sec., normally at most approx. 3 sec. and preferably at most approx. 2 sec. Naturally, the abutment time employed is adapted to the temperature of the conditioning mandrel and the properties of the plastic material. The temperatures and times disclosed in this paragraph relate to temperature conditioning of a blank of PET whose wall thickness is of the order of magnitude of 2 mm. It will be obvious that, for other plastic materials and/or other dimensions of the blank, the conditioning time will be adapted to meet the relevant situation.

Once the conditioning mandrel has abutted against the blank during the predetermined time, the mandrel is contracted and withdrawn from the blank The blank is then displaced to the next position where, in applicable cases, a new abutment of the conditioning mandrel of this position takes place against the material of the blank for exchange of thermal energy between mandrel and blank. Also in this position, the abutment time is governed in analogy with that disclosed in the preceding paragraph. It will be obvious that the cycle for the temperature conditioning of the blank may be repeated in one individual station by allowing the mandrel to run through the above-disclosed schedule more than once with the holder remaining in the same position.

Having passed the positions for temperature conditioning, the blank is moved to position 5. As a rule, the blank rests in this position on the working surface 52 of the draw ring 50 (cf. FIG. 4a). When the blank has assumed its location in position 5, the orientation mandrel 60 is displaced downwardly and through the aperture 35 in the base plate 33, whereupon the bottom surface 65 of the mandrel, on abutment against the inwardly facing bottom surface 13 of the blank, displaces this surface, and thereby also the blank 10, through the aperture. At this point, the gap 54 is formed between the orientation mandrel 60 and the draw ring 50, the size of this gap being less than the thickness of the wall 15 of the blank. On passing through the gap, the material in the wall abuts against the working surface 52 of the draw ring 50, whereby, in conjunction with the passage into the gap, the material thickness of the wall of the blank is reduced and tensile forces are applied to the material in the blank in the axial direction of the blank. A transition zone is formed between thin (as a rule oriented) material which has passed through the gap, and thick (as a rule generally amorphous) material which has not yet passed through the gap. On displacement of the orientation mandrel, the transition zone is shifted into the amorphous material. Hereby, the material in the wall 15 is oriented in an axial direction when the material passes the working surface 52. Depending upon the desired application of the invention, all material in the blank is oriented or only a part thereof. In practical applications in which reduced material thickness is imparted to all of the material in the wall of the blank, the reformed blank is located beneath the draw ring once the movement of the orientation mandrel is completed. A channel 62 for pressure medium is provided for releasing the reformed blank from the orientation mandrel. Once the orientation mandrel has returned to its starting position, the holder 30 is displaced to position 1, whereafter the above cycle is repeated.

The temperature of the holder 30 is generally adjusted to a level which at most amounts to a temperature at which the thermoplastic material begins to thermocrystallize. As a rule, adjustment is therefore effected at a temperature within the range of the TG of the thermoplastic material, but in certain embodiments at a temperature which is less than TG. For PET a temperature of at most approx. 85° C., preferably at most approx. 80° C., has proved to entail good temperature distribution in the wall of the blank.

Since all of the mechanical devices which are in contact with the plastic material consist of material with a good coefficient of thermal conductivity (as a rule metals) there will be achieved according to the invention an adjustment and control within narrow tolerance limits of the temperature of the thermoplastic material in all stages of the above-described cycle. This is particularly important in the transition region 18 of the wall of the blank where, in conjunction with the reduction of material and prevailing orientation, energy is released which needs to be removed. Since the plastic material abuts against the orientation mandrel 60, against the holder 30 and against the working surface 52, the material is, also in this critical region, wholly enclosed by material possessing good thermal conductivity properties, which makes for the requisite transfer of energy between the thermoplastic material and the mechanical devices. It will further be apparent from the above description that also before its passage through the draw ring, the thermoplastic material is, by means of the holder wall 31 of the mechanical devices, the conditioning mandrel 20 and the orientation mandrel 60, respectively, given a temperature adapted to those conditions which apply in order that the desired reduction of the thickness of the thermoplastic material and orientation (crystallization) through the material shall take place on passage by the blank of the draw ring.

Both during passage through the gap 54 and thereafter—for example, during the previously described temperature conditioning cycle—the side wall 31 of the holder 30 has, via its defining surface 32 facing the blank, influenced the temperature distribution within the blank. In certain practical applications and/or positions, the defining surface 32 is at a lower temperature than the side surface 26 of the conditioning mandrel 20 while in other practical applications and/or positions, the defining surface 32 is at a temperature which exceeds the surface temperature of the side surface 26 of the conditioning mandrel. In the normal case, the side surface 26 of the holder is at a temperature which is less than, or in the region of, TG.

On displacement by the drive means of the orientation mandrel 60 through the aperture 35, the orientation mandrel displaces the closed bottom portion 11 of the blank ahead of it, at the same time as the orientation mandrel forms, between itself and the draw ring 50, the gap 54 whose size, in the case of PET, at most amounts to approx. half of the material thickness of the original blank, which consists substantially of amorphous material. This is taken to mean thermoplastic material of a crystallinity at most amounting to approx. 10%. As a result of the relative displacement of the orientation mandrel 60 in relation to the draw ring 50 and thereby the displacement of the bottom portion of the blank, the wall of the blank is forced to pass through the gap 54, whereby the thickness of the wall of the blank is reduced along with the simultaneous monoaxial orientation of the material of the blank. Thus, during displacement of the orientation mandrel, the amount and length of the monoaxially oriented material are progressively increased while, at the same time the amount and length of the amorphous material are reduced. In practical applications in which all material in the wall of the blank passes through the gap, all material in the wall will, thus, be oriented. By means of the channels 38, 58 and 68 in the wall 31 of the holder 30, in the draw ring 50 and in the orientation mandrel 60, respectively, the temperature of the material in the transition region 18 is controlled. Hence, it applies that for amorphous material, i.e. material which has not yet passed through the gap, a final adjustment of the temperature of the material of the blank is effected by means of the orientation mandrel 60 and the side wall 31 of the holder 30. During the orientation process proper, the draw ring 50 plays an active role in drawing off that thermal energy which is developed in connection with orientation of the material, but also the orientation mandrel 60 itself assists in preventing the temperature from passing that temperature range within which the contemplated orientation is achieved.

In the embodiment illustrated in FIG. 6, the system is stepwise rotated by the holder about the center shaft 34. Each time the system stops, one operation is executed. In position 1, the holder 30 is loaded with the blank consisting substantially of amorphous material. In the next step, the holder is moved to position 2 where the blank undergoes heating or cooling in accordance with that described above with reference to FIGS. 1b-3. Thereafter, the blank is displaced to positions 3 and 4, respectively, where a corresponding treatment is repeated, in applicable cases. Finally, the blank is displaced to position 5 where the temperature conditioning and reforming of the blank described with reference to FIGS. 4 and 5 take place. In order to enable this reforming, the substrate, i.e. the plate 33, is, in position 5, provided with an aperture corresponding to the aperture in FIG. 4. When the orientation mandrel has been displaced to its lowermost position and all material in the blank has passed through the gap between the orientation mandrel and the draw ring, compressed air is generally employed to release the reformed blank from the orientation mandrel. This is achieved in that the orientation mandrel is provided with a channel 62 through which the compressed air passes and whereby the reformed blank is blown free of the orientation mandrel. Thereafter, the orientation mandrel returns to its starting position.

In certain embodiments, the channels and ducts for heat carrying medium are replaced by electric resistor wires. The channels and ducts for said medium are generally employed only when the holder 30 or the orientation mandrel 60, respectively, is used for cooling material in the blank.

In the foregoing, the invention has been described in connection with temperature conditioning of a blank whose material thickness is to be reduced in that the blank is to pass through gap 54. It will, however, be obvious to one skilled in the art that the technique described above is suited for application for temperature conditioning of plastic material as a preparatory measure for reforming a blank into a container irrespective of the prior art technique employed for such reforming.

The above detailed description has referred to but a limited number of embodiments of the present invention, but it will be readily perceived by those skilled in the art that the inventive concept as herein disclosed encompasses a large number of embodiments without departing from the spirit and scope of the appended claims.

What is claimed is:

1. A method of adjusting the temperature of a tubular body of plastic material and shaping said tubular body, comprising:
    inserting an expandable first mechanical device into a tubular body of plastic material positioned, in a second mechanical device which at least partially surrounds the tubular body with clearance,
    dimensioning the first mechanical device in relation to said tubular body so that a gap is formed between the first mechanical device and said tubular body when the first mechanical device is inserted into said tubular body so that the first mechanical device does not come into contact with said tubular body,
    expanding the first mechanical device after its insertion into said tubular body so that the first mechanical device abuts against the tubular body and expands the tubular body into reliable contact with the second mechanical device,
    effecting heat exchange between the first mechanical device and the tubular body to adjust the temperature of the tubular body, while maintaining the temperature of the second mechanical device at a value to effect temperature control of the tubular body,
    supporting the thus expanded tubular body in a holder with a bottom of the tubular body facing an aperture in said holder,
    positioning a draw ring around said aperture, and
    axially displacing the bottom of said tubular body through said aperture and past said draw ring to produce elongation of the wall of said tubular body and reduction of its thickness to effect monoaxial orientation of the material of the wall of the temperature controlled tubular body.

2. A method as claimed in claim 1 comprising raising the temperature of the first mechanical device so that when it is inserted into the tubular body it is at a temperature exceeding the glass transition temperature (TG) of the plastic material, and contracting the first mechanical device so as to be out of contact with the plastic material before the plastic material becomes tacky but after the plastic material is thermocrystallized.

3. A method as claimed in claim 2, said first mechanical device being successively brought into and out of abutment with said tubular body a plurality of times, such that after the first abutment each successive abutment is effected after a temperature change from the previous abutment has taken place over 1/6th of the wall thickness of the tubular body.

4. A method as claimed in claim 3 wherein the temperature change from the previous abutment takes place over ¼th the wall thickness of the tubular body before the next abutment is effected.

5. A method as claimed in claim 1, said first mechanical device having an outer surface which abuts against the tubular body and maintaining the outer surface of the first mechanical device at a temperature of at least 10° C. above TG of the plastic material.

6. A method as claimed in claim 5 wherein the temperature of the outer surface of the first mechanical device exceeds TG by 50° C.

7. A method as claimed in claim 5 wherein the outer surface of the first mechanical device remains in abutment with the tubular body for at most approximately 5 sec.

8. A method as claimed in claim 7 wherein the outer surface of the first mechanical device remains in abutment with the tubular body for at most approximately 2 sec.

9. A method as claimed in claim 1, wherein the temperature of the second mechanical device is maintained at a value in proximity to the temperature of the material of the tubular body at which it begins to thermocrystallize.

10. A method as claimed in claim 9 wherein the temperature of the second mechanical device is in the range of TG of the thermoplastic material.

11. A method as claimed in claim 1 comprising successively transporting the tubular body around a center axis between successive work stations at one of which said first mechanical device is inserted into the tubular body and is removed therefrom.

12. A method as claimed in claim 11 comprising at a station after the insertion of the first mechanical device into the tubular body, effecting the elongating of said tubular body to produce monoaxial orientation in the wall of the tubular body along with thickness reduction of said wall.

13. Apparatus for adjusting the temperature of a tubular body of plastic material and shaping the body, comprising:
   support means for the tubular body,
   a mechanical device including a mandrel,
   means for relatively moving said support means and said mechanical device to insert said mandrel into said tubular body and to remove said mandrel from said tubular body,
   said mandrel being expandable and contractible and having a contracted position in which the mandrel is inserted into and removed from the tubular body with clearance all around and without contact with said tubular body and an expanded position in contact with said tubular body, and
   means for effecting heat exchange between the mandrel and said tubular body to adjust the temperature of the tubular body,
   said support means comprising a holder in which the tubular body is inserted and removed,
   said holder having an opening at which a bottom of the tubular body is disposed when in said holder, said apparatus further comprising
   a draw ring surrounding said opening, said draw ring having an inner diameter which is greater than an outer diameter of the expanded mandrel by an amount which is less than the thickness of a side wall the tubular body, and
   means for relatively displacing said bottom of said tubular body and said holder axially, after the side wall of the tubular body has been expanded to cause the bottom of the tubular body to pass through said draw ring and produce monoaxial orientation of the temperature controlled material of said side wall of said tubular body.

14. Apparatus as claimed in claim 13 wherein said holder has an inner surface corresponding in shape to the outer surface of the tubular body.

15. Apparatus as claimed in claim 13 wherein said side wall of said tubular body fits with clearance in said holder so as to be out of contact therewith, said mandrel having an expansion range to cause the mandrel to abut against said side wall of said tubular body and cause the side wall of the tubular body to expand and abut against said holder in reliable contact therewith.

16. Apparatus as claimed in claim 13 wherein said mandrel includes two mandrel segments which are movable towards and away from one another.

* * * * *